US010333638B2

(12) United States Patent
Zhihua et al.

(10) Patent No.: US 10,333,638 B2
(45) Date of Patent: Jun. 25, 2019

(54) METHOD FOR PREDICTING OUTDOOR THREE-DIMENSIONAL SPACE SIGNAL FIELD STRENGTH BY EXTENDED COST-231-WALFISCH-IKEGAMI PROPAGATION MODEL

(71) Applicant: Ranplan Wireless Network Design Limited, Cambridge Cambridgeshire (GB)

(72) Inventors: Lai Zhihua, Cambridge (GB); Xia Bing, Hertfordshire (GB)

(73) Assignee: RANPLAN WIRELESS NETWORK DESIGN LIMITED, Cambridgeshire (GB)

( * ) Notice: Subject to any disclaimer, the term of this patent is extended or adjusted under 35 U.S.C. 154(b) by 0 days.

(21) Appl. No.: 15/522,728

(22) PCT Filed: Oct. 27, 2015

(86) PCT No.: PCT/GB2015/053224
§ 371 (c)(1),
(2) Date: Apr. 27, 2017

(87) PCT Pub. No.: WO2016/067018
PCT Pub. Date: May 6, 2016

(65) Prior Publication Data
US 2018/0278349 A1    Sep. 27, 2018

(30) Foreign Application Priority Data

Oct. 27, 2014 (CN) .......................... 2014 1 0584361

(51) Int. Cl.
*G01S 5/02* (2010.01)
*H04W 16/18* (2009.01)
(Continued)

(52) U.S. Cl.
CPC ........ *H04B 17/3913* (2015.01); *G01S 5/0252* (2013.01); *H04B 17/373* (2015.01);
(Continued)

(58) Field of Classification Search
CPC .............. H04B 17/3913; H04B 17/373; H04B 17/3912; G01S 5/0252; H04W 16/18; H04W 24/06; H04W 16/22
(Continued)

(56) References Cited

U.S. PATENT DOCUMENTS 6,477,376 B1 *  11/2002  Carter .................. H04W 16/18
                                                      455/423
2004/0116113 A1   6/2004  Watanabe
(Continued)

FOREIGN PATENT DOCUMENTS

| CN | 103365962 A | 10/2013 |
| CN | 103634810 A | 3/2014 |
| CN | 103702338 A | 4/2014 |

OTHER PUBLICATIONS

Amarasinghe, K.C., et. al. "Comparison of Propagation Models for Fixed WiMAX System based on IEEE 802.16-2004." *Fourth International Conference on Industrial and Information Systems 2009*, Dec. 28-31, 2009, Sri Lanka, IEEE, 2009. pp. 123-129.
(Continued)

*Primary Examiner* — Kamran Afshar
*Assistant Examiner* — Nicole M Louis-Fils
(74) *Attorney, Agent, or Firm* — Mintz Levin Cohn Ferris Glovsky and Popeo, P.C.

(57) ABSTRACT

A method for predicting outdoor three-dimensional space signal field strength by extended COST-231-Walfisch-Ikegami propagation model, comprising: establishing a three-dimensional scene model between a transmitting base station and a predicted region space; performing an on-site
(Continued)

measurement according to a certain resolution in a prediction region and recording wireless signal strength information at a height of 1 m above the ground; acquiring a vertical cross section between the transmitting base station and a receiving point at a height of 1 m above the ground, and acquiring therefrom an average roof height, an average street width and an average between-building space; predicting a reception signal strength at a measurement point in a calculation formula of a COST-231-Walfishch-Ikegami propagation model; correcting the COST-231-Walfishch-Ikegami propagation model of the measurement point according to an error $\Delta$ between measured data and a prediction result; acquiring a vertical cross section between the transmitting base station and a receiving point at other height of the measurement point, and filtering therefrom buildings outside a Fresnel circle to re-acquire the average roof height, the average street width and the average between-building space; and calculating a reception signal strength at other height of the measurement point according to the corrected COST-231-Walfishch-Ikegami propagation model.

5 Claims, 3 Drawing Sheets

(51) Int. Cl.
   H04W 16/22    (2009.01)
   H04W 24/06    (2009.01)
   H04B 17/318   (2015.01)
   H04B 17/373   (2015.01)
   H04B 17/391   (2015.01)

(52) U.S. Cl.
   CPC ........... *H04W 16/18* (2013.01); *H04W 24/06* (2013.01); *H04B 17/318* (2015.01); *H04B 17/3912* (2015.01); *H04W 16/22* (2013.01)

(58) Field of Classification Search
   USPC .......................................... 455/446
   See application file for complete search history.

(56) References Cited

U.S. PATENT DOCUMENTS

2011/0287801 A1* 11/2011 Levin ................. H04B 17/391
                                                  455/517
2014/0170986 A1*  6/2014 Blaunshtein ......... H04W 16/18
                                                  455/67.13
2015/0092700 A1*  4/2015 Li ..................... H04L 43/0829
                                                  370/329

OTHER PUBLICATIONS

European Commission. *COST Action 231: Digital Mobile Radio Towards Future Generation Systems. Final Report.* European Communities, 1999. 516 pages.

Frederiksen, F., et. al. "Prediction of Path Loss in Environments With High-Raised Buildings." *Vehicular Technology Conference*, Sep. 24-28, 2000, Piscataway, New Jersey, IEEE, 2000, vol. 2, 898-903.

Gschwendtner, B. E., et al. "Ray Tracing vs. Ray Launching in 3-D Microcell Modelling," *1st European Personal and Mobile Communications Conference (EPMCC)*, Bologna (Nov. 1995):74-79.

Hata, Masaharu. "Empirical Formula for Propagation Loss in Land Mobile Radio Services." *IEEE Transactions on Vehicular Technology*, vol. VT-29, No. 3, Aug. 1, 1980 (Aug. 1, 1980), pp. 317-325.

International Search Report issued in International Application No. PCT/GB2015/053224, dated Aug. 2, 2016 (Feb. 8, 2016).

Majedi, S.M.S and F. Farzaneh. "A New Empirical-Physical Method for Calculation of Path Loss for Fixed Wireless Access in Suburban Areas." *2008 International Symposium on Telecommunications*, Aug. 27, 2008, Piscataway, New Jersey, IEEE, 2008, pp. 92-96.

Nagy, Lajos. "FDTD and Ray Optical Methods for Indoor Wave Propagation Modeling." *Microwave Review*. (Jul. 2010): pp. 47-53.

* cited by examiner

METHOD FOR PREDICTING OUTDOOR THREE-DIMENSIONAL SPACE SIGNAL FIELD STRENGTH BY EXTENDED COST-231-WALFISCH-IKEGAMI PROPAGATION MODEL

CROSS-REFERENCES TO RELATED APPLICATIONS

This application is a national stage entry, filed under 35 U.S.C. § 371, of International Application No. PCT/GB2015/053224, filed on Oct. 27, 2015, and claims the benefit of and priority to Chinese Patent Application No. 201410584361.5, filed Oct. 27, 2014, the entire contents of each are hereby incorporated herein by reference in their entireties and for all purposes.

FIELD OF THE INVENTION

The present invention relates to a method for predicting outdoor three-dimensional space signal field strength by an extended COST-231-Walfisch-Ikegami propagation model, which belongs to the field of electromagnetic wave propagation prediction in mobile communication.

BACKGROUND OF THE INVENTION

Wireless propagation models are a group of mathematical expressions, charts or algorithms for predicting radio propagation characteristics in a given environment. Generally speaking, a propagation model can be either an empirical model (also referred to as a statistic model) or a theoretical model (also referred to as a deterministic model), or combination of the two. The empirical model implicitly takes account of the influences of all the environmental factors, regardless of whether they are independent from or interactional on each other. The accuracy of the empirical model is not only dependent on the accuracy of the measurement, but also related to the similarly between the analyzed environment and the model adapted environment. That type of model has high calculation efficiency and is usually used in the wireless signal prediction in outdoor large-scale scene. The conventional outdoor empirical prediction model includes model Okumura-Hata [1] applied to outdoor macro cells, and model COST-231-Walfisch-Ikegami [2] applied to outdoor micro cells. The theoretical model is based on the physical principle of radio wave propagation, and it calculates a radio wave propagation procedure in a particular environment according to a particular environment model. The calculation accuracy is high, while the calculation efficiency is relatively low, and the theoretical model is usually used for the wireless signal prediction of an indoor scene. The conventional indoor propagation model includes a ray tracing propagation model [3] and a finite difference time domain propagation model [4].

REFERENCES

[1] M. Hata, "*Empirical Formula for Propagation Loss in Land Mobile Radio Service*", IEEE Trans. Vehic. Tech., vol. 29, no. 3, 1980.
[2] "Propagation Prediction Models", COST 231 Final Rep., ch. 4, pp. 17-21.
[3] Gschwendtner, B. E. G. WÄol° e, B. Burk, and F. M. Landstorfer, *Ray tracing vs. ray launching in 3D micro-cell modelling,*" 1st European Personal and Mobile Communications Con ference(EPMCC), 74-79, Bologna, November 1995.
[4] Lajos Nagy, "*FDTD and Ray Optical Methods for Indoor Wave Propagation Modeling*" Microwave Review, 47-53, July, 2010.

COST-231-Walfisch-Ikegami model is an outdoor empirical propagation model. It is based on detailed street and building data information. It acquires an average roof height, an average street width and an average between-building space according to a vertical cross section between a transmitting antenna and a receiving antenna. It calculates a line-of-sight (LOS) propagation loss or a non-line-of-sight propagation (NLOS) loss (including free space loss, diffraction loss of roof and diffraction loss of multiple barriers) by determining whether there is LOS propagation between the transmitting antenna and the receiving antenna. In the urban environment, the roof diffraction is the main component of signal propagation, thus the model has an accurate prediction result in the empirical model. Since the conventional outdoor signal prediction only concerns the signal coverage conditions in an outdoor region at a height of 1 m above the ground, the model is only adaptive to outdoor environment prediction at a height of 1 m above the ground. However, with the development of wireless communication techniques, indoor and outdoor united networks planning and optimizing has become a key point in network planning and establishment by the mobile operators. Indoor and outdoor united simulation is the premise of indoor and outdoor united planning. The influence of outdoor base station signal on indoor high-rise building is an issue needs to be considered carefully in indoor and outdoor united simulation. In order to predict the influence of outdoor signal on indoor high-rise building signal, a signal field strength generated by the outdoor base station around the indoor high-rise building shall be predicted firstly.

In general, at present one technical problem that needs to be solved urgently by persons skilled in the art is how to rapidly and accurately predict a signal field strength generated by the outdoor base station antenna in the three-dimensional space.

SUMMARY OF THE INVENTION

Aiming at the defects of existing technology, the present invention provides a method for predicting outdoor three-dimensional space signal field strength by an extended COST-231-Walfisch-Ikegami propagation model.

OUTLINE OF THE INVENTION

A method for predicting outdoor three-dimensional space signal field strength by extended COST-231-Walfisch-Ikegami propagation model, comprising: establishing a three-dimensional scene model from the transmitting base station to the predicted region space; performing an on-site measurement according to a certain resolution in a prediction region and recording wireless signal strength information at a height of 1 m above the ground; acquiring a vertical cross section between the transmitting base station and a receiving point at a height of 1 m above the ground, and acquiring therefrom an average roof height, an average street width and an average between-building space; predicting a reception signal strength at a measurement point in a calculation formula of a COST-231-Walfishch-Ikegami propagation model; correcting the COST-231-Walfishch-Ikegami propagation model of the measurement point according to an error Δ between measured data and a prediction result; acquiring a vertical cross section between the transmitting base station and a receiving point at other height of the measurement point, and filtering therefrom buildings outside a Fresnel circle to re-acquire the average roof height, the average street width and the average between-building space; and calculating a reception signal strength at other height of the measurement point according to the corrected COST-231-Walfishch-Ikegami propagation model.

DETAILS OF THE INVENTION

A method for predicting outdoor three-dimensional space signal field strength by an extended COST-231-Walfisch-Ikegami propagation model, comprising:

(1) establishing a three-dimensional scene model between a transmitting base station and a predicted region space:

using the existing modeling technology to establish a three-dimensional scene model between the transmitting base station and the predicted region space by importing GIS format map, wherein the three-dimensional scene model comprises street information and three-dimensional building models of all buildings within a scope of the transmitting base station and a prediction region;

wherein the buildings within the scope of the transmitting base station and the prediction region are determined as all buildings within a first Fresnel circle between the transmitting base station and receiving points of the prediction region; radius r of the first Fresnel circle is calculated by $$r = \sqrt{\frac{\lambda d_1 d_2}{d}},$$

wherein λ is wavelength of electromagnetic wave, d represents distance from the transmitting base station to a receiving point, S represents an infinite plane that is perpendicular to a line connecting a transmitting point and a receiving point, and $d_1$ and $d_2$ represent distances between the transmitting base station and the plane S and between the receiving point and the plane S respectively; the three-dimensional building model information includes building outer envelope information, building height information $h_{roof}$, and building geographical location information; and the street information includes street width information w, and street geographical location information;

(2) measuring a wireless signal strength at a height of 1 m within the prediction region using existing instruments according to a fixed resolution to form measurement data (x, y, z, $M_{rx}$) of each receiving point;

the measurement data of each receiving point includes location information and wireless signal strength information of the receiving point, wherein x is longitude information of the receiving point, y is latitude information of the receiving point, z is height information of the receiving point, and $M_{rx}$ is reception signal strength;

(3) predicting reception signal strength of a measurement point at a height of 1 m according to the COST-231-Walfisch-Ikegami propagation model:

acquiring a vertical cross section between the transmitting base station and a measurement point at a height of 1 m above the ground, and acquiring therefrom key parameters of the COST-231-Walfisch-Ikegami propagation model, wherein the key parameters include an average roof height $h_{roof}$, an average street width w, an average between-building space b, a base station height $h_{tx}$, a receiving point height $h_{rx}$, a base station transmitting power W, a base station transmitting signal frequency f, a distance d between the base station and the measurement point, and an angle φ between an incident direction of a base station direct wave and a direction of a street to which the measurement point belongs;

predicting a reception signal strength $T_{rx}$ of the receiving point according to a calculation formula of the COST-231-Walfisch-Ikegami propagation model, comprising steps (3-1) to (3-3):

(3-1): calculating propagation losses of line-of-sight propagation and non-line-of-sight propagation between the base station and a test point respectively, by calculating a propagation loss $L_{blos}$ of line-of-sight propagation in accordance with step (3-2) and calculating a propagation loss $L_{bNlos}$ of non-line-of-sight propagation in accordance with step (3-3), therefore propagation loss $L_b$ is represented as the following formula:

$$L_b = \begin{cases} L_{blos}, \text{ when there is line-of-sight propagation from a transmitting} \\ \qquad\qquad \text{point to a receiving point} \\ L_{bNlos}, \text{ when there is non-line-of-sight propagation from a} \\ \qquad\qquad \text{transmissing point to a receiving point} \end{cases}$$

(3-2): if there is line-of-sight propagation between the base station and the test point, the propagation loss is calculated by formula $L_{blos}$=42.6+26lgd+20lgf;

(3-3): if there is non-line-of-sight propagation between the base station and the test point, the propagation loss is calculated by formula $L_{bNlos}$=$L_{bs}$+$L_{rts}$+$L_{msd}$, wherein $L_{bs}$ is propagation loss of a free space, $L_{rts}$ is diffraction and scattering loss from the roof to the street, $L_{msd}$ is diffraction loss of multiple barriers, and $L_{bs}$, $L_{rts}$ and $L_{msd}$ are calculated by a specific method including steps (3-3-1) to (3-3-3):

(3-3-1): in step (3-3), $L_{bs}$ is calculated by formula:

$L_{bs}$=32.45+20lgd+20lgf;

(3-3-2): in step (3-3), $L_{rts}$ is calculated by formula:

$$L_{rts} = \begin{cases} -16.9 - 10lgw + 10lgf + 20lg(h_{roof} - h_{rx}) + L_{ori}, \text{ when } h_{roof} > h_{rx} \\ 0, \text{ when } L_{rts} < 0 \end{cases}$$

wherein $$L_{ori} = \begin{cases} -10 + 0.354\phi, & 0° \leq \phi < 35° \\ 2.5 + 0.075 \times (\phi - 35), & 35° \leq \phi < 55° \\ 4.0 - 0.114 \times (\phi - 35), & 55° \leq \phi < 90° \end{cases}$$

(3-3-3): in step (3-3), $L_{msd}$ is calculated by formula:

$$L_{msd} = \begin{cases} L_{bsh} + K_a + K_d lgd + K_f lgf - 9lbg \\ 0, \text{ when } L_{msd} < 0 \end{cases}$$

wherein, $$L_{bsh} = \begin{cases} -18lg(1 + h_{tx} - h_{roof}), h_{tx} > h_{roof} \\ 0, \text{ when } h_{tx} \leq h_{roof} \end{cases}$$

-continued $$K_a = \begin{cases} 54, & h_{tx} > h_{roof} \\ 54 - 0.8 \times (h_{tx} - h_{roof}), & d \geq 0.5 \text{ km and } h_{tx} \leq h_{roof} \\ 54 - 0.8 \times (h_{tx} - h_{roof}) \times \left(\frac{d}{0.5}\right), & d < 0.5 \text{ km and } h_{tx} \leq h_{roof} \end{cases}$$

$$K_d = \begin{cases} 18, & h_{tx} > h_{roof} \\ 18 - 15\left(\frac{h_{tx} - h_{roof}}{h_{roof} - h_{rx}}\right), & h_{tx} \leq h_{roof} \end{cases}$$

$$K_f = -4 + \begin{cases} 0.7 \times \left(\frac{f}{925} - 1\right), & \text{for a medium-sized city and a suburban} \\ & \text{center having trees of medium density} \\ 1.5 \times \left(\frac{f}{925} - 1\right), & \text{for center of a big city} \end{cases}$$

(3-4) when there is line-of-sight propagation between the transmitting base station and the test point, the reception signal field strength of the test point is $T_{los}=W-L_{blos}$;

when there is non-line-of-sight propagation between the transmitting base station and the test point, the reception signal field strength of the test point is $T_{Nlos}=W-L_{bNlos}$, therefore the signal field strength of the test point is represented as:

$$T_{rx} = \begin{cases} T_{los} = W - L_{blos}, & \text{when there is line-of-sight propagation from a} \\ & \text{transmitting point to a receiving point} \\ T_{Nlos} = W - L_{bNlos}, & \text{when there is line-of-sight propagation from a} \\ & \text{transmissing point to a receiving point} \end{cases};$$

(4) calculating an error $\Delta = M_{rx} - T_{rx}$ between a measured value and a predicted value in a formula according to the actually measured field strength $M_{rx}$ and a predicted field strength $T_{rx}$ of the test point, and correcting the calculation formula of the COST-231-Walfisch-Ikegami propagation model of the test point;

(5) acquiring a vertical cross section between the transmitting base station and the receiving point at an extended height hr) of the test point, and filtering therefrom buildings outside the first Fresnel circle between the transmitting point and the receiving point, to re-acquire key parameters of the COST-231-Walfisch-Ikegami propagation model and calculating the reception signal strength at the extended height $h_{rx}'$ according to the corrected COST-231-Walfisch-Ikegami propagation model;

(6) changing height of $h_{rx}'$, repeating step (5), and calculating reception signal strength at all extended heights on the receiving point using an algorithm of the corrected COST-231-Walfisch-Ikegami propagation model;

(7) changing the location of the test point, repeating steps (3) to (6), and calculating reception signal strength at all extended heights on all the test points to acquire a prediction signal field strength in a three-dimensional space of an outdoor area of a building within the prediction region.

Preferably according to the invention, a correction value between the actually measured field strength $M_{rx}$ and the predicted field strength $T_{rx}$ in step (4) includes a corrected value $\Delta_{los}$ of line-of-sight propagation and a corrected value $\Delta_{Nlos}$ of non-line-of-sight propagation:

$$\Delta = M_{rx} - T_{rx} =$$
$$\begin{cases} \Delta_{los} = M_{rx} - T_{los}, & \text{when there is line-of-sight propagation from} \\ & \text{a transmitting point to a receiving point} \\ \Delta_{Nlos} = M_{rx} - T_{Nlos}, & \text{when there is non-line-of-sight propagation from} \\ & \text{a transmissing point to a receiving point} \end{cases}$$

Preferably according to the invention, step (5) comprises calculating the reception signal strength of the extended height $h_{rx}'$ of the test point in step (3) using the calculation formula of the corrected COST-231-Walfisch-Ikegami propagation model in step (4), including steps (5-1) to (5-2):

(5-1) acquiring a vertical cross section between the transmitting base station and the extended height $h_{rx}'$ of the test point, and filtering therefrom buildings outside the first Fresnel circle between the transmitting point and the receiving point, a calculation method of the radius r of the first Fresnel circle is the same as that of the step (1), $$r = \sqrt{\frac{\lambda d_1 d_2}{d}},$$

wherein, d represents distance from the transmitting base station to the receiving point, S represents an infinite plane that is perpendicular to a line connecting the transmitting point and the receiving point, $d_1$ and $d_2$ represent distance between the transmitting base station and the plane S and between the receiving point and the plane S respectively, the first Fresnel radius is a radius of a circle that is formed by intersecting the plane S and a Fresnel ellipsoid;

(5-2) re-acquiring key parameters of the COST-231-Walfisch-Ikegami propagation model according to three-dimensional building and street information after filtered out the first Fresnel circle, calculating field strength $T_{rx}'$ of the receiving point using the formula of the step (3), and correcting the receiving point signal field strength using a correction parameter $\Delta$ calculated in the step (4), and the corrected receiving point field strength is represented as $T_{rx}''=T_{rx}'+\Delta$.

Preferably according to the invention, step (6) comprises changing a value of $h_{rx}'$ at a height interval according to a predicted resolution; repeating calculation procedure of step (5) to calculate prediction results at all extended heights from 1 m to $2h_{rx}$:

applying a mirror principle extended model algorithm when the calculated height $h_{rx}'>h_{tx}$ and there is non-line-of-sight propagation, and replacing the actual height $h_{rx}'$ with a mirrored height $h_{rx}''$ when the COST-231-Walfishch-Ikegami propagation model formula is applied, wherein the mirrored height conforms to formula $$h_{rx}'' = \begin{cases} 2h_{tx} - h_{rx}', & \text{when } h_{rx}' > h_{tx} \\ h_{rx}', & \text{when } h_{rx}' \leq h_{tx} \end{cases}.$$

BENEFICIAL EFFECTS OF THE INVENTION

1. The COST-231-Walfisch-Ikegami propagation model is a typical outdoor empirical type propagation model. Since the detailed three-dimensional building and street information between the transmitting base station and the receiving point, the prediction result is more accurate relative to other empirical models. However, that model is an outdoor coverage prediction model and it only takes account of the prediction result of a horizontal plane at a height of 1 m above the ground. The invention provides a method for predicting outdoor three-dimensional space signal field strength by an extended COST-231-Walfisch-Ikegami propagation model, which can predict the signal coverage conditions of a three-dimensional space within a height above the ground of twice the height of the base station transmitting antenna.

2. The invention provides a method for predicting outdoor three-dimensional space signal field strength by an extended COST-231-Walfisch-Ikegami propagation model, and when there is non-line-of-sight propagation, the Fresnel circle principle is applied to filter buildings outside the first Fresnel radius, so as to obtain more accurate model parameters for non-line-of-sight propagation, and improve the model prediction accuracy.

3. The invention provides a method for predicting outdoor three-dimensional space signal field strength by an extended COST-231-Walfisch-Ikegami propagation model, and when the height of the reception signal is larger than the height of the base station transmitting antenna, the mirror image principle is applied to predict the signal coverage conditions of a three-dimensional space within a height above the ground of twice the height of the base station transmitting antenna, and the model accuracy is also improved.

4. The invention provides a method for predicting outdoor three-dimensional space signal field strength by an extended COST-231-Walfisch-Ikegami propagation model, which can obtain the wireless signal field strength around the three-dimensional building, so as to provide the premise for predicting coverage from the outdoor base station to indoor and planning and optimizing indoor and outdoor united networks.

DETAILED DESCRIPTION OF EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Hereinafter the invention is further described with reference to the accompanying figures and embodiment, but the invention is not limited thereto.

Figure 1:
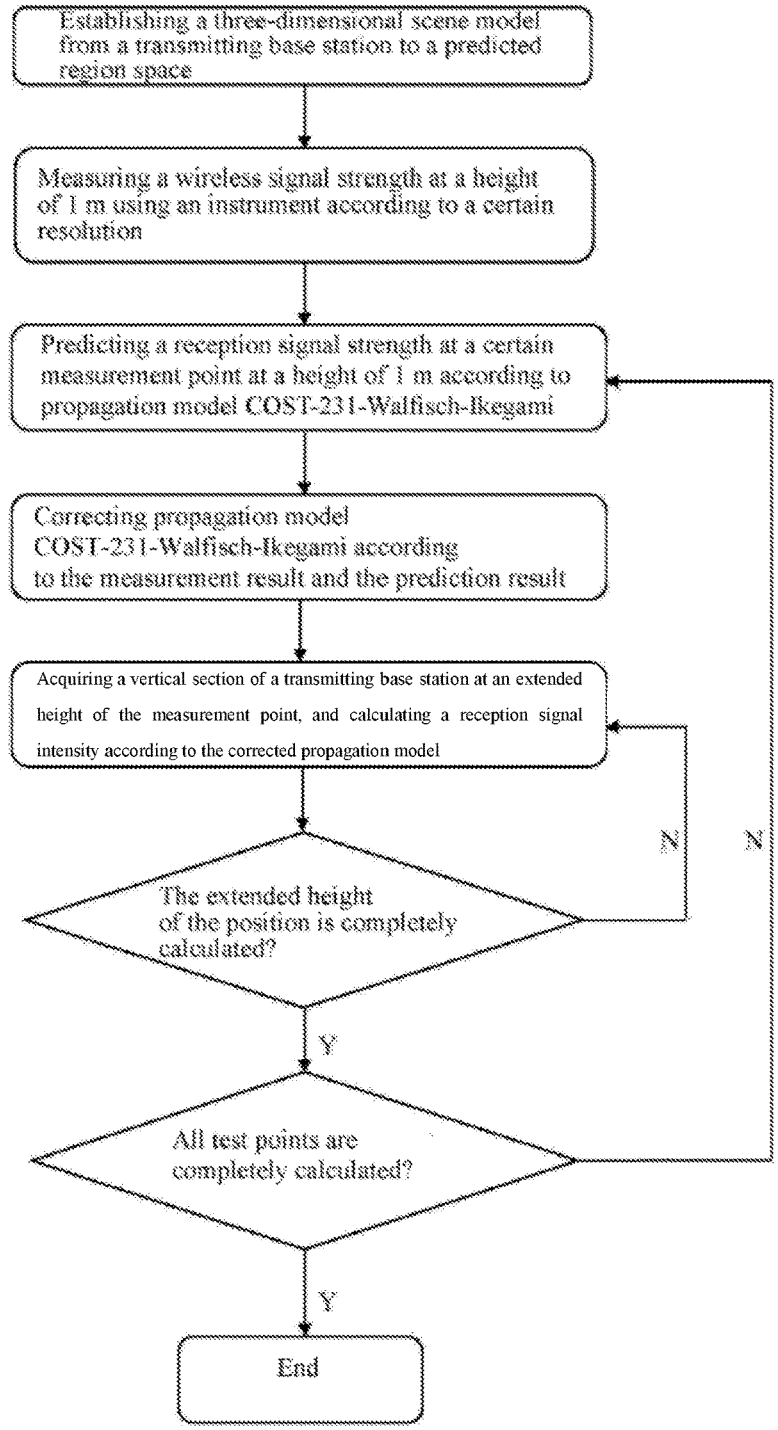
FIG. 1 is a flowchart of a predicting outdoor three-dimensional space signal field strength by an extended COST-231-Walfisch-Ikegami propagation model according to the invention.
Figure 2:
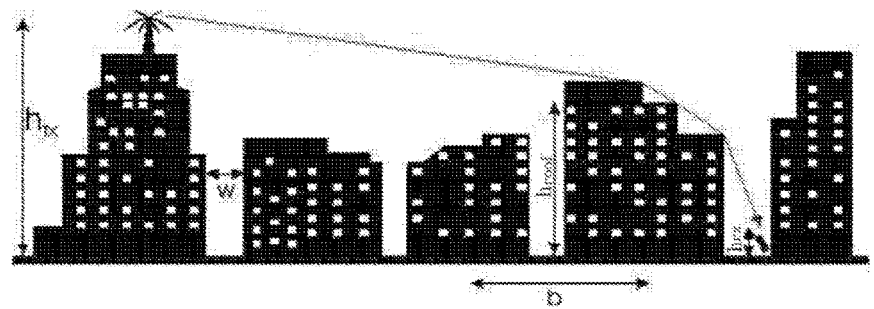
FIG. 2 illustrates a vertical cross section and model parameters of COST-231-Walfisch-Ikegami propagation model according to the invention.
Figure 3:
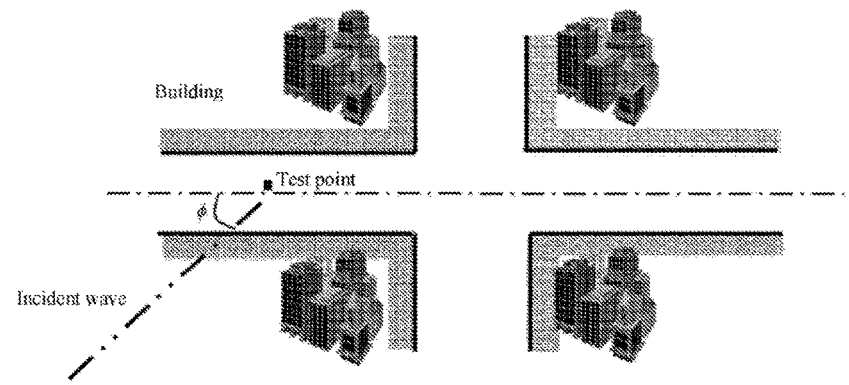
FIG. 3 illustrates an angle $\varphi$ between an incident direction of a base station direct wave and a direction of a street to which a test point belongs according to the invention.
Figure 4:
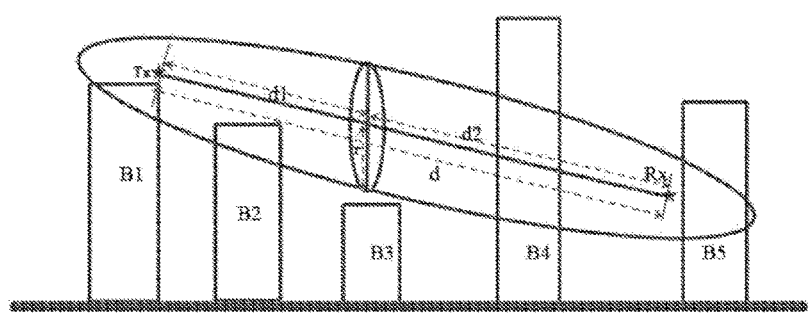
FIG. 4 is a schematic diagram of Fresnel circle filtered buildings according to the invention.
Figure 5:
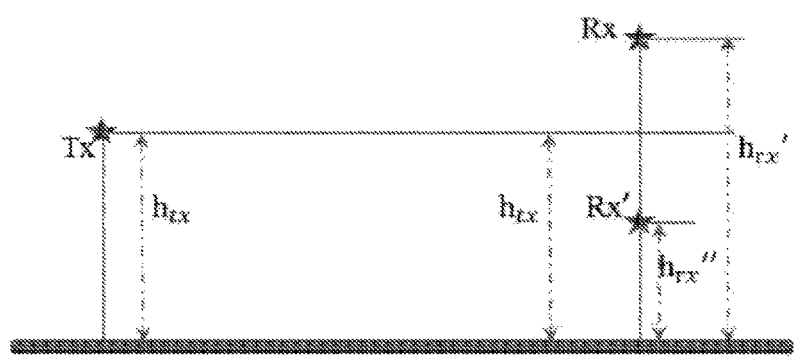
FIG. 5 is a mirror image schematic diagram according to the invention.

As shown in FIGS. 1-5.

Embodiment

An extended COST-231-Walfisch-Ikegami propagation model predicts the field strength generated by an outdoor base station antenna around a building in a center region of a big city.

(1) Establishing a three-dimensional scene model from a transmitting base station to a predicted region space:

according to the given 5 m-accuracy GIS map information of Luohu, Shenzhen, establishing a three-dimensional scene model between a transmitting base station and a predicted region space, wherein the three-dimensional scene model comprises street information and three-dimensional building models of all buildings within a scope of the transmitting base station and the prediction region; all buildings within the scope of the transmitting base station and the prediction region are determined as all buildings within a first Fresnel circle between the transmitting base station and receiving points of the prediction region; radius r of the first Fresnel circle is calculated by $$r = \sqrt{\frac{\lambda d_1 d_2}{d}},$$

wherein a represents distance between the transmitting base station and a receiving point d=600 m, S represents an infinite plane that is perpendicular to a line connecting a transmitting point and a receiving point, $d_1$ and $d_2$ represent distance between the transmitting base station and the plane S and between the receiving point and the plane S respectively, $d_1+d_2$=600 m, $\lambda$ is wavelength of electromagnetic wave, a frequency f of the electromagnetic wave is 2600 MHz, propagation velocity of the electromagnetic wave is velocity of light c, $\lambda$=c/f=3/26 m, a first Fresnel radius is a radius of a circle that is formed by intersecting the plane S and a Fresnel ellipsoid, therefore Fresnel radius in the center of the ellipsoid is $$r = \sqrt{\frac{\lambda d_1 d_2}{d}} = \sqrt{\frac{3 \times 300 \times 300}{26 \times 600}} = 4.16 \text{ m};$$

the three-dimensional building model information includes building outer envelope information, building height information, and building geographical location information; and the street information includes street width information w, and street geographical location information;

(2) selecting streets around a building as a prediction region, and measuring a wireless signal strength at a height of 1 m within the prediction region using the existing instruments according to a resolution of 5 m to form measurement data (x, y, z, $M_{rx}$) of each receiving point:

the measurement data of each receiving point includes location information and wireless signal strength information of the receiving point, wherein x is longitude information of the receiving point, y is latitude information of the receiving point, z is height information of the receiving point, and $M_{rx}$ is actual reception signal strength;

(3) selecting a receiving point P, and acquiring the key parameters of the COST-231-Walfisch-Ikegami propagation model according to a vertical cross section between the transmitting base station and the receiving point, wherein the key parameters include an average roof height $h_{roof}$=30 m, an average street width w=14 m, an average between-building space b=100 m, a base station height $h_{tx}$=39 m, a receiving point height $h_{rx}$=1 m, a base station transmitting power W=49.63 dBm, a base station transmitting signal frequency f=2600 MHz, a distance from the base station to the receiving point d=0.6 km, and an angle between an incident direction of a base station direct wave and a direction of a street to which a test point belongs (φ=37.5°;

(3-1) calculating propagation losses of line-of-sight propagation and non-line-of-sight propagation between the base station and the receiving point respectively, by calculating a propagation loss $L_{blos}$ of line-of-sight propagation in accordance with step (3-2) and calculating a propagation loss $L_{bNlos}$ of non-line-of-sight propagation in accordance with step (3-3), therefore propagation loss $L_b$ is represented as a following formula:

(3-2) if P is line-of-sight propagation, then propagation loss is calculated by a formula: $L_{blos}$=42.6+26lgd+20lgf=42.6+26*lg0.6+20*lg2600=105.13 dB;

$$T_{rx} = \begin{cases} T_{los} = W - L_{blos} = -55.5 \text{ dBm}, & \text{when there is line-of-sight propagation from a transmitting point to a receiving point} \\ T_{Nlos} = W - L_{bNlos} = -94.03 \text{ dBm}, & \text{when there is non-line-of-sight propagation from a transmitting point to a receiving point} \end{cases}$$

(3-3) if P is non-line-of-sight propagation, then propagation loss is calculated according to a formula $L_{bNlos}$=$L_{bs}$+$L_{rts}$+$L_{msd}$, wherein $L_{bs}$ is propagation loss of a free space, $L_{rts}$ is diffraction and scattering loss from the roof to the street, $L_{msd}$ is diffraction loss of multiple barriers, and $L_{bs}$, $L_{rts}$ and $L_{msd}$ are calculated by a specific method including steps (3-3-1) to (3-3-3):

(3-3-1): $L_{bs}$ is calculated by a formula:

$L_{bs}$=32.45+20lgd+20lgf=32.45+20lg0.6+20lg2600=96.3.

(3-3-2): $L_{rts}$ is calculated by a formula:

$$L_{rts} = -16.9 - 10lgw + 10lgf + 20lg(h_{roof} - h_{rx}) + L_{ori}$$
$$= -16.9 - 10lg14 + 10lg2600 + 20lg(30-1) + L_{ori}$$

wherein, $L_{ori}$=2.5+0.075×(φ-35)=2.5+0.075×(37.5-35)=2.64 thus $L_{rts}$=37.7;

(3-3-3): $L_{msd}$ is calculated by a formula:

$$L_{msd} = L_{bsh} + Ka + K_d lgd + K_f lgf - 9lgb$$
$$= L_{bsh} + K_a + K_d lg0.6 + K_f lg2600 - 9lg100$$

wherein, $L_{bsh}$=-18lg(1+$h_{tx}$-$h_{roof}$)=-18lg(1+9)=-18

$K_a$=54

$K_d$=18

$$K_f = -4 + 1.5 \times \left(\frac{f}{925} - 1\right) = -4 + 1.5 \times \left(\frac{2600}{925} - 1\right) = -1.28$$

thus $L_{msd}$=-18+54+18×lg0.6-1.28×lg2600-9×lg100=9.62

$L_{bNlos}$=$L_{bs}$+$L_{rts}$+$L_{msd}$=96.3+37.7+9.62=143.66

(3-4): the receiving point signal field strength is calculated according to a following formula:

(4) measurement data according to the test position, M=98.5 dBm, $$\Delta = \begin{cases} \Delta_{los} = M_{rx} - T_{los} = -43 \text{ dBm}, & \text{when there is line-of-sight propagation from a transmitting point to a receiving point} \\ \Delta_{Nlos} = M_{rx} - L_{Nlos} = -4.47 \text{ dBm}, & \text{when there is non-line-of-sight propagation from a transmitting point to a receiving point} \end{cases}$$

(5) acquiring a vertical cross section between the transmitting base station and the receiving point at an extended height $h_{rx}'$=4 m of the measurement point P, filtering therefrom buildings outside the first Fresnel circle between the transmitting point and the receiving point, and it is judged that there is non-line-of-sight propagation between the transmitting point and the receiving point, thus maintaining an average roof height $h'_{roof}$=30 m, an average street width w'=14 m, an average between-building space b'=100 m, a base station height $h'_{tx}$=39 m, a receiving point height $h'_{rx}$=4 m, a base station signal transmitting power W'=49.63 dBm, a base station transmitting signal frequency f'=2600 MHz, a distance from the base station to the reception pint d'=0.6 km, and an angle between an incident direction of a base station direct wave and a direction of a street to which a test point belongs φ'=37.5°. $T_{rx}'$=-93.08 is calculated using steps (3-1) to (3-5);

The reception signal strength $T_{rx}''$ at the extended height $h_{rx}'$ of the measurement point is calculated according to the corrected COST-231-Walfisch-Ikegami propagation model. $T''_{rx}$=$T'_{rx}$+Δ=-93.08-4.47=-97.55 dBm;

(6) at an interval of 3 m, changing the heights of $h_{rx}'$ ($h_{rx}'$≤$h_{tx}$) into (7, 10, 13, 16, 19, 22, 25, 28, 31, 34, 37) m, respectively, filtering buildings outside the first Fresnel circle between the transmitting point and the receiving point; if it is determined that there is still non-line-of-sight propagation between the transmitting point and the receiving point, then the average roof heights h'$_{roof}$ are (30, 30, 30, 30, 33.75, 33.75, 33.75, 38, 38, 38, 38) m, respectively, the average street widths w' are (14, 14, 14, 14, 16.8, 16.8, 16.8, 21, 21, 21, 21) m, respectively, the average between-building spaces b' are (100, 100, 100, 100, 120, 120, 120, 150, 150, 150, 150) m, respectively, the distances d' between the base station and the receiving point are (0.6, 0.6, 0.599, 0.599, 0.599, 0.599, 0.599, 0.599, 0.599, 0.599, 0.599) km, respectively, the base station signal transmitting power W'=49.63 dBm, the base station transmitting signal frequency f'=2600 MHz, and the angle between the incident direction of the base station direct wave and the direction of the street to which the test point belongs φ'=37.5°;

repeating step (5), reception signal strength at all extended heights on the receiving point are calculated as (−96.49, −95.25, −93.83, −92.14, −94.77, −92.79, −90.23, −98.46, −95.36, −90.5, −78.46) dBm, respectively using an algorithm of the corrected COST-231-Walfisch-Ikegami propagation model;

when the heights of h$_{rx}$' are further extended to (40, 43), h$_{rx}$'>h$_{rx}$, buildings outside the first Fresnel circle are filtered according to the cross section between the transmitting point and the receiving point, and it is determined that there is still non-line-of-sight propagation between the transmitting point and the receiving point; in that case, mirror image heights are calculated as (38, 35) m, respectively, according to mirror image principle h$_{rx}$''=2h$_{rx}$−h$_{rx}$'; in that case, h'$_{roof}$ are (38, 48) m respectively, w' are (21, 28) m respectively, b' are (150, 200) m respectively, d' are (0.599, 0.599) km respectively, the base signal transmitting power W=49.63 dBm, the base station transmitting signal frequency f'=2600 MHz, and the angle between the incident direction of the base station direct wave and the direction of the street to which the test point belongs φ'=37.5°;

repeating step (5), reception signal strength at all extended heights on the receiving point are calculated as (−71.74, −95.61) dBm, respectively using an algorithm of the corrected COST-231-Walfisch-Ikegami propagation model; when the heights of h$_{rx}$' are further extended to (46, 49, 52, 55, 58, 61, 64, 67, 70, 73, 76) m, buildings outside the first Fresnel circle are filtered according to the cross section between the transmitting point and the receiving point, and it is judged that there is line-of-sight propagation between the transmitting point and the receiving point; the distances d' between the base station and the receiving point are (0.599, 0.599, 0.599, 0.599, 0.599, 0.599, 0.599, 0.6, 0.6, 0.6, 0.6) km respectively, the base signal transmitting power W'=49.63 dBm, and the base station transmitting signal frequency f'=2600 MHz; repeating step (5), reception signal strength at all extended heights on the receiving point are calculated as (−98.48, −98.48, −98.48, −98.48, −98.48, −98.48, −98.48, −98.5, −98.5, −98.5, −98.5) dBm, respectively using the corrected COST-231-Walfisch-Ikegami propagation model formula;

(7) selecting other test points, and repeating steps (3) to (6) to calculate the signal field strength of the three-dimensional space.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for predicting outdoor three-dimensional space signal field strength by an extended COST-231-Walfisch-Ikegami propagation model, comprising:

(1) establishing a three-dimensional scene model from a transmitting base station to a predicted region space:

establishing the three-dimensional scene model from the transmitting base station to the predicted region space by importing GIS format map, the three-dimensional scene model comprises street information and three-dimensional building models of all buildings within a scope of the transmitting base station and a prediction region;

wherein the buildings within the scope of the transmitting base station and the prediction region are determined as all buildings within a first Fresnel circle between the transmitting base station and receiving points of the prediction region; radius r of the first Fresnel circle is calculated by $$r = \sqrt{\frac{\lambda d_1 d_2}{d}},$$

wherein λ is wavelength of electromagnetic wave, d represents distance from the transmitting base station to a receiving point, S represents an infinite plane that is perpendicular to a line connecting a transmitting point and a receiving point, and $d_1$ and $d_2$ represent distances between the transmitting base station and the plane S and between the receiving point and the plane S respectively; the three-dimensional building model information includes building outer envelope information, building height information h$_{roof}$, and building geographical location information; and the street information includes street width information w, and street geographical location information;

(2) measuring a wireless signal strength at a height of 1 m within the prediction region using existing instruments according to a fixed resolution to form measurement data (x, y, z, M$_{rx}$) of each receiving point;

the measurement data of each receiving point includes location information and wireless signal strength information of the receiving point, wherein x is longitude information of the receiving point, y is latitude information of the receiving point, z is height information of the receiving point, and M$_{rx}$ is reception signal strength;

(3) predicting reception signal strength of a measurement point at a height of 1 m according to the COST-231-Walfisch-Ikegami propagation model;

acquiring a vertical cross section between the transmitting base station and a measurement point at a height of 1 m above the ground, and acquiring therefrom key parameters of the COST-231-Walfisch-Ikegami propagation model, wherein the key parameters include an average roof height h$_{roof}$, an average street width w, an average between-building space b, a base station height $h_{tx}$, a receiving point height $h_{rx}$, a base station transmitting power W, a base station transmitting signal frequency f, a distance d between the base station and the measurement point, and an angle φ between an incident direction of a base station direct wave and a direction of a street to which the measurement point belongs;

predicting a reception signal strength $T_{rx}$ of the receiving point according to a calculation formula of the COST-231-Walfisch-Ikegami propagation model, comprising steps (3-1) to (3-3):

(3-1): calculating propagation losses of line-of-sight propagation and non-line-of-sight propagation between the base station and a test point respectively, by calculating a propagation loss $L_{blos}$ of line-of-sight propagation in accordance with step (3-2) and calculating a propagation loss $L_{bNlos}$ of non-line-of-sight propagation in accordance with step (3-3), therefore propagation loss $L_b$ is represented as a following formula:

$$L_b = \begin{cases} L_{blos}, & \text{when there is line-of-sight propagation from a transmitting point to a receiving point} \\ L_{bNlos}, & \text{when there is non-line-of-sight propagation from a transmitting point to a receiving point} \end{cases}$$

(3-2): if there is line-of-sight propagation between the base station and the test point, the propagation loss is calculated by a formula $L_{blos}=42.6+26lgd+20lgf$;

(3-3): if there is non-line-of-sight propagation between the base station and the test point, the propagation loss is calculated by a formula $L_{bNlos}=L_{bs}+L_{rts}+L_{msd}$, wherein $L_{bs}$ is propagation loss of a free space, $L_{rts}$ is diffraction and scattering loss from the roof to the street, $L_{msd}$ is diffraction loss of multiple barriers, and $L_{bs}$, $L_{rts}$ and $L_{msd}$ are calculated by a specific method including steps (3-3-1) to (3-3-3):

(3-3-1): in step (3-3), $L_{bs}$ is calculated by a formula:
$L_{bs}=32.45+20lgd+20lgf$;

(3-3-2): in step (3-3), $L_{rts}$ is calculated by a formula:

$$L_{rts} = \begin{cases} -16.9 - 10lgw + 10lgf + 20lg(h_{roof} - h_{rx}) + L_{ori}, & \text{when } h_{roof} > h_{rx} \\ 0, & \text{when } L_{rts} < 0 \end{cases}$$

wherein $L_{ori} = \begin{cases} -10 + 0.354\phi, & 0° \leq \phi < 35° \\ 2.5 + 0.075 \times (\phi - 35), & 35° \leq \phi < 55° \\ 4.0 - 0.114 \times (\phi - 35), & 55° \leq \phi < 90° \end{cases}$ (3-3-3): in step (3-3), $L_{msd}$ is calculated by a formula:

$$L_{msd} = \begin{cases} L_{bsh} + K_a + K_d lgd + K_f lgf - 9lgb \\ 0, \text{ when } L_{msd} < 0 \end{cases}$$

wherein, $$L_{bsh} = \begin{cases} -18lg(1 + h_{tx} - h_{roof}), & h_{tx} > h_{roof} \\ 0, & \text{when } h_{tx} \leq h_{roof} \end{cases}$$

$$K_a = \begin{cases} 54, & h_{tx} > h_{roof} \\ 54 - 0.8 \times (h_{tx} - h_{roof}), & d \geq 0.5 \text{ km and } h_{tx} \leq h_{roof} \\ 54 - 0.8 \times (h_{tx} - h_{roof}) \times \left(\dfrac{d}{0.5}\right), & d < 0.5 \text{ km and } h_{tx} \leq h_{roof} \end{cases}$$

$$K_d = \begin{cases} 18, & h_{tx} > h_{roof} \\ 18 - 15\left(\dfrac{h_{tx} - h_{roof}}{h_{roof} - h_{rx}}\right), & h_{tx} \leq h_{roof} \end{cases}$$

$$K_f = -4 + \begin{cases} 0.7 \times \left(\dfrac{f}{925} - 1\right), & \text{for a medium-sized city and a suburban center having trees of medium density} \\ 1.5 \times \left(\dfrac{f}{925} - 1\right), & \text{for center of a big city} \end{cases}$$

(3-4) when there is line-of-sight propagation between the transmitting base station and the test point, the reception signal field strength of the test point is $T_{los}=W-L_{blos}$;

when there is non-line-of-sight propagation between the transmitting base station and the test point, the reception signal field strength of the test point is $T_{Nlos}=W-L_{bNlos}$, therefore the signal field strength of the test point is represented as:

$$T_{rx} = \begin{cases} T_{los} = W - L_{blos}, & \text{when there is line-of-sight propagation from a transmitting point to a receiving point} \\ T_{Nlos} = W - L_{bNlos}, & \text{when there is line-of-sight propagation from a transmitting point to a receiving point} \end{cases};$$

(4) calculating an error $\Delta=M_{rx}-T_{rx}$ between a measured value and a predicted value according to the actually measured field strength $M_{rx}$ and a predicted field strength $T_{rx}$ of the test point, and correcting the calculation formula of the COST-231-Walfisch-Ikegami propagation model of the test point;

(5) acquiring a vertical cross section between the transmitting base station and the receiving point at an extended height $h_{rx}'$ of the test point, and filtering therefrom buildings outside the first Fresnel circle between the transmitting point and the receiving point, to re-acquire key parameters of the COST-231-Walfisch-Ikegami propagation model and calculating the reception signal strength at the extended height $h_{rx}'$ according to the corrected COST-231-Walfisch-Ikegami propagation model;

(6) changing height of $h_{rx}'$, repeating step (5), and calculating reception signal strength at all extended heights on the receiving point using an algorithm of the corrected COST-231-Walfisch-Ikegami propagation model;

(7) changing the location of the test point, repeating steps (3) to (6), and calculating reception signal strength at all extended heights on all the test points to acquire a prediction signal field strength in a three-dimensional space of an outdoor area of a building within the prediction region.

2. The method for predicting outdoor three-dimensional space signal field strength by the extended COST-231-Walfisch-Ikegami propagation model according to claim 1, wherein a correction value between the actually measured field strength $M_{rx}$ and the predicted field strength $T_{rx}$ in step (4) includes a corrected value $\Delta_{los}$ of line-of-sight propagation and a corrected value $\Delta_{Nlos}$ of non-line-of-sight propagation:

$$\Delta = M_{rx} - T_{rx} = \begin{cases} \Delta_{los} = M_{rx} - T_{los}, & \text{when there is line-of-sight propagation from a transmitting point to a receiving point} \\ \Delta_{Nlos} = M_{rx} - T_{Nlos}, & \text{when there is non-line-of-sight propagation from a transmitting point to a receiving point} \end{cases}$$

3. The method for predicting outdoor three-dimensional space signal field strength by the extended COST-231-Walfisch-Ikegami propagation model according to claim 1, wherein step (5) comprises calculating the reception signal strength at the extended height $h_{rx}'$ of the test point in step (3) using the calculation formula of the corrected COST-231-Walfisch-Ikegami propagation model in step (4), including steps (5-1) to (5-2):

(5-1) acquiring a vertical cross section between the transmitting base station and the extended height $h_{rx}'$ of the test point, and filtering therefrom buildings outside the first Fresnel circle between the transmitting point and the receiving point, a calculation method of the radius r of the first Fresnel circle is the same as that of the step (1), $$r = \sqrt{\frac{\lambda d_1 d_2}{d}},$$

wherein, d represents distance from the transmitting base station to the receiving point, S represents the infinite plane that is perpendicular to the line connecting the transmitting point and the receiving point, $d_1$ and $d_2$ represent distance between the transmitting base station and the plane S and between the receiving point and the plane S respectively, the first Fresnel radius is a radius of a circle that is formed by intersecting the plane S and a Fresnel ellipsoid;

(5-2) re-acquiring key parameters of the COST-231-Walfisch-Ikegami propagation model according to three-dimensional building and street information after filtered out the first Fresnel circle, calculating field strength $T_{rx}'$ of the receiving point using the formula of the step (3), and correcting the receiving point signal field strength using a correction parameter $\Delta$ calculated in the step (4), and the corrected receiving point field strength is represented as $T_{rx}''=T_{rx}'+\Delta$.

4. The method for predicting outdoor three-dimensional space signal field strength by the extended COST-231-Walfisch-Ikegami propagation model according to claim 1, wherein step (6) comprises changing a value of $h_{rx}'$ at a height interval according to a predicted resolution; repeating calculation procedure of step (5) to calculate prediction results at all extended heights from 1 m to $2h_{rx}$:

applying a mirror principle extended model algorithm when the calculated height $h_{rx}'>h_{tx}$ and there is non-line-of-sight propagation, and replacing actual height $h_{rx}'$ with a mirrored height $h_{rx}''$ when the COST-231-Walfishch-Ikegami propagation model formula is applied, wherein the mirrored height conforms to formula $$h_{rx}'' = \begin{cases} 2h_{tx} - h_{rx}', & \text{when } h_{rx}' > h_{tx} \\ h_{rx}', & \text{when } h_{rx}' \leq h_{tx} \end{cases}.$$

5. A method for predicting outdoor three-dimensional space signal field strength by extended COST-231-Walfisch-Ikegami propagation model, comprising:

establishing a three-dimensional scene model from a transmitting base station to a predicted region space;

performing an on-site measurement according to a certain resolution in a prediction region and recording wireless signal strength information at a height of 1 m above a ground;

acquiring a vertical cross section between the transmitting base station and a receiving point at a height of 1 m above the ground, and acquiring therefrom an average roof height, an average street width and an average between-building space;

predicting a reception signal strength at a measurement point in a calculation formula of a COST-231-Walfishch-Ikegami propagation model;

correcting the COST-231-Walfishch-Ikegami propagation model of the measurement point according to an error $\Delta$ between measured data and a prediction result;

acquiring a vertical cross section between the transmitting base station and a receiving point at another height of the measurement point, and filtering therefrom buildings outside a Fresnel circle to re-acquire the average roof height, the average street width and the average between-building space; and calculating a reception signal strength at the other height of the measurement point according to the corrected COST-231-Walfishch-Ikegami propagation model.

* * * * *